United States Patent
Wang

(10) Patent No.: US 9,547,210 B2
(45) Date of Patent: Jan. 17, 2017

(54) LIQUID CRYSTAL DISPLAY PANEL AND ARRAY SUBSTRATE

(71) Applicant: Shenzhen China Star Optoelectronics Technology Co., Ltd., Shenzhen, Guangdong (CN)

(72) Inventor: Jinjie Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 301 days.

(21) Appl. No.: 14/385,997

(22) PCT Filed: Sep. 2, 2014

(86) PCT No.: PCT/CN2014/085774
§ 371 (c)(1),
(2) Date: Sep. 17, 2014

(87) PCT Pub. No.: WO2016/026167
PCT Pub. Date: Feb. 25, 2016

(65) Prior Publication Data
US 2016/0238914 A1 Aug. 18, 2016

(30) Foreign Application Priority Data
Aug. 21, 2014 (CN) .......................... 2014 1 0416413

(51) Int. Cl.
G02F 1/1362 (2006.01)
G02F 1/1343 (2006.01)
G02F 1/1368 (2006.01)

(52) U.S. Cl.
CPC ....... *G02F 1/136286* (2013.01); *G02F 1/1368* (2013.01); *G02F 1/13624* (2013.01);
(Continued)

(58) Field of Classification Search
CPC ..................... G02F 1/136286; G02F 1/134309
See application file for complete search history.

(56) References Cited

U.S. PATENT DOCUMENTS

| 8,487,849 | B2 | 7/2013 | Kim | |
|---|---|---|---|---|
| 2007/0109468 | A1* | 5/2007 | Oku | ................. G02F 1/133514 349/110 |

(Continued)

FOREIGN PATENT DOCUMENTS

| CN | 1916706 A | 2/2007 |
|---|---|---|
| CN | 101004527 A | 7/2007 |

*Primary Examiner* — Sang V Nguyen
(74) *Attorney, Agent, or Firm* — Andrew C. Cheng

(57) ABSTRACT

This invention discloses a liquid crystal display panel and an array substrate. The liquid crystal display device comprises a first substrate, a second substrate, a liquid crystal layer sandwiched between the first substrate and the second substrate. There are a plurality of scan lines and data lines on the first substrate. The liquid crystal display panel are divided into multiple pixel areas by the scan lines and data lines. The area of the main pixel area is getting larger and the area of the sub-pixel area is getting smaller from a edge to a center of the liquid crystal display panel, and voltage applied on the sub-pixel area when displaying is smaller than the main pixel area. This design enhances the brightness uniformity of the liquid crystal display panel and eliminate the whiting issues in the side edges.

15 Claims, 1 Drawing Sheet

(52) U.S. Cl.
CPC ........... *G02F 1/134309* (2013.01); *G02F 2001/134345* (2013.01)

(56) References Cited

U.S. PATENT DOCUMENTS

| | | | |
|---|---|---|---|
| 2008/0174712 A1* | 7/2008 | Kim .................... | G02F 1/13624 349/48 |
| 2011/0051007 A1* | 3/2011 | Hosaka ................ | G09G 3/3648 348/673 |
| 2014/0111556 A1* | 4/2014 | Chen .................... | G09G 3/20 345/690 |
| 2014/0160230 A1* | 6/2014 | Kuo .................... | H04N 5/23296 348/36 |

* cited by examiner

LIQUID CRYSTAL DISPLAY PANEL AND ARRAY SUBSTRATE

TECHNICAL FIELD

This invention is related to the liquid crystal display technology, especially related to the liquid crystal display panel and the array substrate.

DESCRIPTION OF RELATED ART

There are lots of advantages of the liquid crystal display device, such as the compact size, power saving and radiation-free, and the LCD devices are very common currently. The LCD device comprises a liquid crystal display panel and a backlight module. The liquid crystal display panel is formed by liquid crystal materials sandwiched by two glass substrate. The working principle of the LCD device is twisting the liquid crystal material for controlling the light transmitting from the backlight module by controlling the voltage between the two glass substrate.

In the conventional LCD device, the voltage applied on the different locations of the liquid crystal display panel is deviated from the best common voltage (Best Vcom). This cause the brightness on the side edges is higher than the center when displaying the gray scale. This whiting issues are serious to the quality of the LCD device.

SUMMARY

This invention discloses a liquid crystal display panel and an array substrate. The liquid crystal display device comprises a first substrate, a second substrate, a liquid crystal layer sandwiched between the first substrate and the second substrate. There are a plurality of scan lines and data lines on the first substrate. The liquid crystal display panel are divided into multiple pixel areas by the scan lines and data lines. The area of the main pixel area is getting larger and the area of the sub-pixel area is getting smaller from a edge to a center of the liquid crystal display panel, and voltage applied on the sub-pixel area when displaying is smaller than the main pixel area. This design enhances the brightness uniformity of the liquid crystal display panel and eliminate the whiting issues in the side edges.

In one embodiment of the present invention, a liquid crystal display panel comprises a first substrate, a second substrate, disposed opposite to the first substrate; and a liquid crystal layer sandwiched by the first substrate and the second substrate. The first substrate comprises a plurality of scan lines disposed on the first substrate; and a plurality of data lines disposed on the first substrate, wherein the scan lines are crossed the data lines and the first substrate is divided into multiple pixel area. The pixel area comprises a main pixel area and a sub-pixel area, the area of the main pixel area is getting larger and the area of the sub-pixel area is getting smaller from a edge to a center of the liquid crystal display panel, and voltage applied on the sub-pixel area when displaying is smaller than the main pixel area. The area of the main pixel area and the sub-pixel area is distributed symmetrically according to a line between middle points of an upper edge and a lower edge of the liquid crystal display panel, and the area of the main pixel area and the sub-pixel area is constant from the upper edge to the lower edge of the liquid crystal display panel.

In one of the embodiments, the main pixel area comprises a main switch unit, disposed on the first substrate, comprising a first gate electrically connected to a corresponding scan line, a first source electrically connected to a corresponding data line a first drain, and a main pixel electrode electrically connected to the first drain.

In one of the embodiments the sub pixel area comprises a sub-switch unit, disposed on the first substrate, comprising a second gate electrically connected to the corresponding scan line, a second source electrically connected to the corresponding data line, and a second drain, and a sub-pixel electrode electrically connected to the second drain, wherein the area of the main pixel area is getting larger and the area of the sub-pixel area is getting smaller from the edge to the center of the liquid crystal display panel.

In one of the embodiments, the pixel area further comprises an electron sharing unit, electrically connected to the sub-pixel electrode for sharing the electrons on the sub-pixel electrode to make the voltage on the sub-pixel electrode is lower than the main pixel electrode.

In one of the embodiments, the electron sharing unit comprises a sharing switch unit and a sharing capacity, wherein the sharing switch unit comprises a third gate electrically connected a neighboring scan line which is neighboring to the corresponding scan line, a third source electrically connected to the sub-pixel electrode, and a third drain, the sharing capacity electrically connected to the third drain, wherein the sharing switch turns ON for sharing the electron on the sub-pixel electrode to make the voltage on the sub-pixel electrode is lower than the main pixel electrode.

In one of the embodiments, the sub-switch unit and the sharing switch unit are thin-film transistors.

In one embodiment of the present invention, an array substrate, comprises a plurality of scan lines, and a plurality of data lines disposed across the scan lines, wherein the array substrate is divided into a plurality of pixel areas by the scan lines and the data lines, and the area of the main pixel area is getting larger and the area of the sub-pixel area is getting smaller from a edge to a center of the array substrate.

In one of the embodiments, the main pixel area comprises a main switch unit disposed on the first substrate and a main pixel electrode, wherein the main switch unit comprises a first gate electrically connected to a corresponding scan line, a first source electrically connected to a corresponding data line; and a first drain, wherein the main pixel electrode electrically connected to the first drain.

In one of the embodiments, the main pixel area comprises a sub-switch unit disposed on the first substrate and a sub-pixel electrode, wherein sub-switch unit comprises a second gate electrically connected to the corresponding scan line, a second source electrically connected to the corresponding data line; and a second drain, wherein the main pixel electrode electrically connected to the first drain.

In one of the embodiments, the pixel area further comprises an electron sharing unit and sharing capacity, wherein the sharing switch unit comprises a third gate electrically connected a neighboring scan line which is neighboring to the corresponding scan line, a third source electrically connected to the sub-pixel electrode; and a third drain, and the sharing capacity is electrically connected to the third drain, wherein the sharing switch turns ON for sharing the electron on the sub-pixel electrode to make the voltage on the sub-pixel electrode is lower than the main pixel electrode.

In one embodiment of the present invention, a liquid crystal display panel comprises a first substrate, a second substrate, disposed opposite to the first substrate; and a liquid crystal layer sandwiched by the first substrate and the second substrate. The first substrate comprises a plurality of scan lines disposed on the first substrate; and a plurality of data lines disposed on the first substrate, wherein the scan lines are crossed the data lines and the first substrate is divided into multiple pixel area. The pixel area comprises a main pixel area and a sub-pixel area, the area of the main pixel area is getting larger and the area of the sub-pixel area is getting smaller from a edge to a center of the liquid crystal display panel, and voltage applied on the sub-pixel area when displaying is smaller than the main pixel area.

In one of the embodiments, the area of the main pixel area and the sub-pixel area is distributed symmetrically according to a line between middle points of an upper edge and a lower edge of the liquid crystal display panel.

In one of the embodiments, the area of the main pixel area and the sub-pixel area is constant from the upper edge to the lower edge of the liquid crystal display panel.

In one of the embodiments, the main pixel area comprises a main switch unit, disposed on the first substrate, comprising a first gate electrically connected to a corresponding scan line, a first source electrically connected to a corresponding data line a first drain, and a main pixel electrode electrically connected to the first drain.

In one of the embodiments the sub pixel area comprises a sub-switch unit, disposed on the first substrate, comprising a second gate electrically connected to the corresponding scan line, a second source electrically connected to the corresponding data line, and a second drain, and a sub-pixel electrode electrically connected to the second drain, wherein the area of the main pixel area is getting larger and the area of the sub-pixel area is getting smaller from the edge to the center of the liquid crystal display panel.

In one of the embodiments, the pixel area further comprises an electron sharing unit, electrically connected to the sub-pixel electrode for sharing the electrons on the sub-pixel electrode to make the voltage on the sub-pixel electrode is lower than the main pixel electrode.

In one of the embodiments, the electron sharing unit comprises a sharing switch unit and a sharing capacity, wherein the sharing switch unit comprises a third gate electrically connected a neighboring scan line which is neighboring to the corresponding scan line, a third source electrically connected to the sub-pixel electrode, and a third drain, the sharing capacity electrically connected to the third drain, wherein the sharing switch turns ON for sharing the electron on the sub-pixel electrode to make the voltage on the sub-pixel electrode is lower than the main pixel electrode.

In one of the embodiments, the sub-switch unit and the sharing switch unit are thin-film transistors.

BRIEF DESCRIPTION OF THE DRAWINGS

The invention is best understood from the following detailed description when read in connection with the accompanying drawings, which illustrate an embodiment of the present invention.

DETAILED DESCRIPTION OF EMBODIMENTS

The present invention will now be described more specifically with reference to the following embodiments. It is to be noted that the following descriptions of embodiments are presented herein for purpose of illustration and description only. It is not intended to be exhaustive or to be limited to the precise form disclosed.

Figure 1:
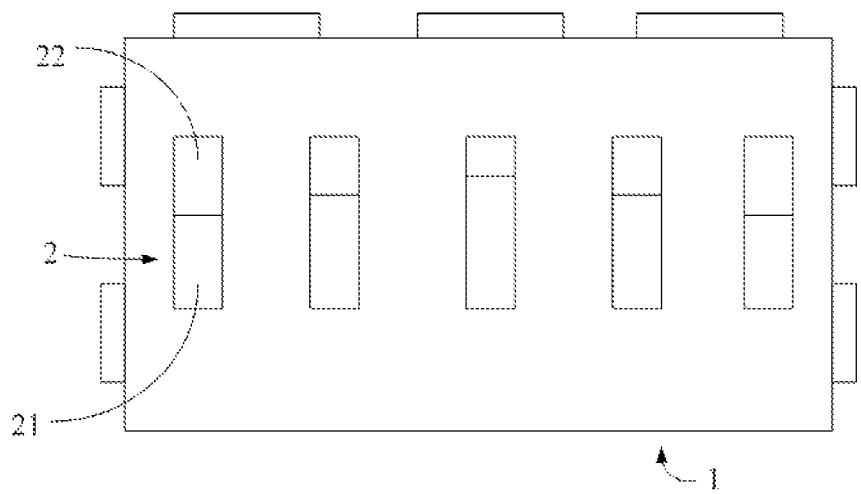
FIG. 1 illustrates the first substrate of the liquid crystal display panel of one embodiment of the present invention.

With reference to FIG. 1, this embodiment discloses a liquid crystal display panel. The liquid crystal display panel comprises a first substrate 1, a second substrate and a liquid crystal layer which is sandwiched between the first substrate 1 and the second substrate. There are a plurality of scan lines and data lines disposed on the first substrate. The scan lines and data lines are disposed on a surface that is approximate to the liquid crystal layer on the first substrate 1. The liquid crystal display panel are divided into multiple pixel areas 2 by the scan lines and data lines. Generally, the scan lines are disposed in paralleled to each other, the data lines are disposed in paralleled to each other, and the scan line is perpendicular to the data line. In another embodiment, the scan lines and the data lines can be disposed in the different way.

Each pixel area 1a comprises a main pixel area 21 and a sub-pixel area 22. In other words, the pixel area 1 is divided into the main pixel area 21 and the sub-pixel area 22. Generally, the area of the main pixel area 21 is larger than the sub-pixel area 22. Moreover, the area of the main pixel area is getting larger from a edge to a center of the liquid crystal display panel, and the area of the sub-pixel area is getting smaller instead. In the present embodiment, the variability in the area of the main pixel area 21 and sub-pixel area 22 from a side edge to a center of the liquid crystal display panel is larger than that from upper edge or lower edge to the center of the liquid crystal display panel. When displaying, the voltage applied on the sub-pixel area 22 is lower than the main pixel area 21. Therefore, the brightness of the sub-pixel area 22 is lower than the main pixel area 21. Moreover, the overall brightness of the pixel area 2 is lowered accordingly.

The present embodiment discloses the liquid crystal panel is divided into multiple pixel area 2. Each of the pixel area 2 comprises a main pixel area 21 and a sub-pixel area 22. Due to the circuit design, the voltage applied on the sub-pixel area 22 is lower than the main pixel area 21. Therefore, the brightness of the sub-pixel area 22 is lower than the main pixel area 21. Moreover, the overall brightness of the pixel area 2 is lowered accordingly. From the side edge to the center of the liquid crystal display panel, the area of the main pixel area 21 in the pixel area is getting larger and the are of the sub-pixel area is getting smaller instead. In other words, the area of the sub-pixel area 22 is smallest in the center of the liquid crystal display panel, and the main pixel area 21 is largest in the side edge of the liquid crystal display panel. Besides, the brightness of the pixel area 2 in the side edge is lower than the pixel area 2 in the center when displaying because the brightness of the sub-pixel area 22 is lower than the main pixel area 21. This design enhances the brightness uniformity of the liquid crystal display panel and eliminate the whiting issues in the side edges.

Besides, the area of the main pixel area 21 and the sub-pixel area 22 is distributed symmetrically according to the line between the middle points of the upper edge and lower edge of the liquid crystal display panel. In other words, the area of the main pixel area 21 and the sub-pixel area 22 is the same on the location which is away from the line between the middle points of the upper edge and lower edge of the liquid crystal display panel in a predetermined distance to avoid the brightness difference between the two side edges.

In another embodiment, the area of the main pixel area 21 and the sub-pixel area 22 is constant along a line from the upper edge to the lower edge of the liquid crystal display panel. In other words, along any lines which is in paralleled with the line between the middles point of the upper edge and the lower edge, the area of the main pixel area 21 and the sub-pixel area 22 is the same. In the real product, there is no difference on the brightness between the upper edge and the lower edge of the liquid crystal display panel.

Figure 2:
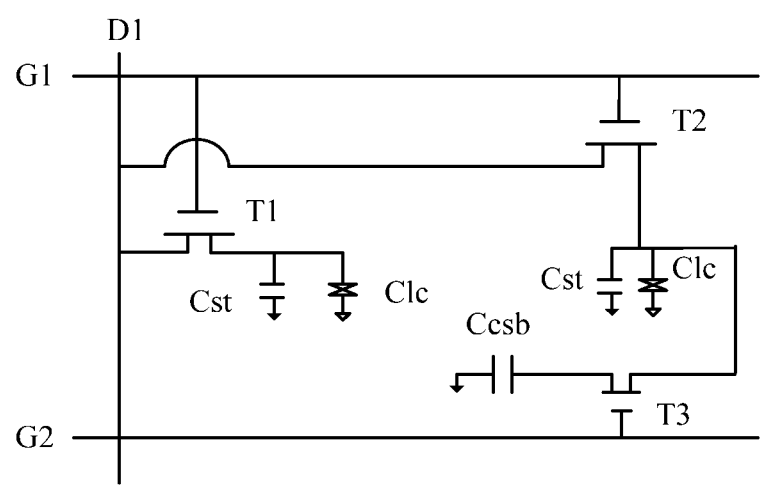
FIG. 2 illustrates the schematic circuit of the first substrate of one embodiment of the present invention.

With reference to FIG. 2, each of the main pixel area comprises a main switch T1 and a main pixel electrode, and each of the sub-pixel area comprises a sub-switch T2 and a sub-pixel electrode. The main switch T1, the main pixel electrode T1, the sub-switch T2 and the sub-pixel electrode are disposed on the first substrate. The main switch T1 comprises a gate, a source and a drain. The gate of the main switch T1 is electrically connected to one corresponding scan line G1, the source of the main switch T1 is electrically connected to one corresponding data line D1, and the drain of the main switch T1 is electrically connected to the main pixel electrode. The sub-switch T2 comprises a gate, a source and a drain. The gate of the sub-switch T2 is electrically connected to the corresponding data line G1, the source of the sub-switch T2 is electrically connected to one corresponding data line D1, and the drain of the sub-switch T2 is electrically connected to the sub-pixel electrode. Along the direction from the edges to the center of the liquid crystal display panel, the main pixel electrode is getting larger and the sub-pixel electrode is getting smaller instead. In this embodiment, the main pixel electrode and the sub-pixel electrode comprise liquid crystal capacity (Clc) and storage capacity (Cst) accordingly. The liquid crystal capacity (Clc) is formed by the pixel electrode, public electrode, and the liquid crystal layer between the pixel electrode and the public electrode. The storage capacity (Cst) is formed by the gate and drain of the switch, and the dielectric layer between the gate and drain of the switch.

Each of the pixel area further comprises a electron sharing unit. The electron sharing unit is electrically connected to the sub-pixel electrode for sharing the electrode. This design makes the voltage on the sub-pixel electrode is lower than the main pixel electrode.

The electron sharing unit comprises a sharing switch T3, and a sharing capacity Ccsb. The sharing switch T3 comprises a gate, a source and a drain. The gate of the sharing switch T3 is electrically connected to a scan line G2 which is right neighboring to the corresponding scan line G1, the source of the sharing switch T3 is electrically connected to the sub-pixel electrode, and the drain of the sharing switch T3 is electrically connected to the sharing capacity (Ccsb). When the scan line G2 which is neighboring to the corresponding scan line G1 is enable, the sharing switch T3 turns ON to share the electron to the sharing capacity (Ccsb) for lowering down the voltage applied on the sub-pixel electrode.

In the present embodiment, the main switch T1, the sub-switch T2 and the sharing switch T3 are thin-film transistors (TFTs) accordingly.

When the scan signal is delivered to the main switch T1 and sub-switch T2 by the corresponding scan line G1, the scan line G1 is enabled and main switch T1 and sub-switch T2 are turned ON. The main pixel electrode and the sub-pixel electrode are charged to the same voltage level. Meanwhile, the brightness of the main pixel area and the sub-pixel area is the same. Subsequently, the scan signal is delivered to the neighboring scan line, and the neighbor scan line is enable. The main switch T1 and sub-switch T2 is turned OFF, and the sharing switch T3 is turned ON. Part of the electrons on the sub-pixel electrode are transferred to the sharing capacity (Ccsb). The voltage in the sub-pixel electrode is lower than the main pixel electrode, and the brightness of the sub-pixel area would be lower then the main pixel area. Besides, the overall brightness of the pixel area is lowered.

In another embodiment, an array substrate comprises a plurality of scan lines and data lines disposed on the first substrate. The array substrate are divided into multiple pixel areas by the scan lines and data lines. Generally, the scan lines are disposed in paralleled to each other, the data lines are disposed in paralleled to each other, and the scan line is perpendicular to the data line. In another embodiment, the scan lines and the data lines can be disposed in the different way.

Each pixel area a comprises a main pixel area and a sub-pixel area. In other words, the pixel area is divided into the main pixel area and the sub-pixel area. Generally, the area of the main pixel area is larger than the sub-pixel area. Moreover, the area of the main pixel area is getting larger from a edge to a center of the array substrate, and the area of the sub-pixel area is getting smaller instead. In the present embodiment, the variability in the area of the main pixel area 21 and sub-pixel area 22 from a side edge to a center of the array substrata is larger than that from upper edge or lower edge to the center of the array substrate.

The present embodiment discloses the array substrate is divided into multiple pixel area. Due to the circuit design, the voltage applied on the sub-pixel area is lower than the main pixel area. Therefore, the brightness of the sub-pixel area is lower than the main pixel area. Moreover, the overall brightness of the pixel area is lowered accordingly. From the side edge to the center of the array substrate, the area of the main pixel area in the pixel area is getting larger and the are of the sub-pixel area is getting smaller instead. Besides, the brightness of the pixel area in the side edge is lower than the pixel area in the center when displaying because the brightness of the sub-pixel area is lower than the main pixel area. This design enhances the brightness uniformity of the array substrate and eliminate the whiting issues in the side edges.

Besides, the area of the main pixel area and the sub-pixel area is distributed symmetrically according to the line between the middle points of the upper edge and lower edge of the array substrate.

Besides, the area of the main pixel area and the sub-pixel area s constant along a line from the upper edge to the lower edge of the array substrate.

Moreover, the main pixel area comprises a main switch T1 and a main pixel electrode, and each of the sub-pixel area comprises a sub-switch T2 and a sub-pixel electrode. The main switch T1, the main pixel electrode T1, the sub-switch T2 and the sub-pixel electrode are disposed on the first substrate. The main switch T1 comprises a gate, a source and a drain. The gate of the main switch T1 is electrically connected to one corresponding scan line G1, the source of the main switch T1 is electrically connected to one corresponding data line D1, and the drain of the main switch T1 is electrically connected to the main pixel electrode. The sub-switch T2 comprises a gate, a source and a drain. The gate of the sub-switch T2 is electrically connected to the corresponding data line G1, the source of the sub-switch T2 is electrically connected to one corresponding data line D1, and the drain of the sub-switch T2 is electrically connected to the sub-pixel electrode. Along the direction from the edges to the center of the array substrate, the main pixel electrode is getting larger and the sub-pixel electrode is getting smaller instead.

Each of the pixel area further comprises a electron sharing unit. The electron sharing unit is electrically connected to the sub-pixel electrode for sharing the electrode. This design makes the voltage on the sub-pixel electrode is lower than the main pixel electrode.

The electron sharing unit comprises a sharing switch, and a sharing capacity. The sharing switch comprises a gate, a source and a drain. The gate of the sharing switch is electrically connected to a scan line which is right neighboring to the corresponding scan line, the source of the sharing switch is electrically connected to the sub-pixel electrode, and the drain of the sharing switch is electrically connected to the sharing capacity. When the scan line which is neighboring to the corresponding scan line is enable, the sharing switch turns ON to share the electron to the sharing capacity for lowering down the voltage applied on the sub-pixel electrode.

In the present embodiment, the main switch, the sub-switch and the sharing switch are thin-film transistors (TFTs) accordingly.

When the scan signal is delivered to the main switch T1 and sub-switch T2 by the corresponding scan line G1, the scan line G1 is enabled and main switch T1 and sub-switch T2 are turned ON. The main pixel electrode and the sub-pixel electrode are charged to the same voltage level. Subsequently, the scan signal is delivered to the neighboring scan line, and the the neighbor scan line is enable. The main switch T1 and sub-switch T2 is turned OFF, and the sharing switch T3 is turned ON. Part of the electrons on the sub-pixel electrode are transferred to the sharing capacity Ccsb. The voltage in the sub-pixel electrode is lower than the main pixel electrode.

Although the description above contains many specificities, these should not be construed as limiting the scope of the embodiment but as merely providing illustrations of some of the presently preferred embodiments. Rather, the scope of the invention is to be determined only by the appended claims and their equivalents.

What is claimed is:

1. A liquid crystal display panel, comprising:
   a first substrate, comprising:
      a plurality of parallel scan lines disposed on the first substrate; and
      a plurality of parallel data lines disposed on the first substrate, wherein the plurality of scan lines are crossed by the plurality of data lines and the first substrate is divided into multiple pixel areas, each pixel area of the multiple pixel areas having a strip-shape of a longitudinal length equal to each other;
   a second substrate, disposed opposite to the first substrate; and
   a liquid crystal layer sandwiched by the first substrate and the second substrate, wherein each pixel area of the multiple pixel areas comprises a main pixel area and a sub-pixel area,
   the main pixel area and the sub-pixel area having a strip-shape of a corresponding width equal to each other, the main pixel area and the sub-pixel area and the sub-pixel area combined to be the longitudinal length of each pixel area of the multiple pixel areas,
   a first longitudinal area of the main pixel area gradually increased from a side edge to a center of the liquid crystal display panel and a second longitudinal area of the sub-pixel area gradually decreased from the side edge to the center of the liquid crystal display panel, and a voltage applied on the sub-pixel area when displaying is smaller than the main pixel area,
   wherein the area of the main pixel area and the sub-pixel area is distributed symmetrically according to a line between middle points of an upper edge and a lower edge of the liquid crystal display panel, and the area of the main pixel area and the sub-pixel area is constant from the upper edge to the lower edge of the liquid crystal display panel.

2. The display panel according to claim 1, wherein the main pixel area comprises:
   a main switch unit, disposed on the first substrate, comprising:
      a first gate, electrically connected to a corresponding scan line;
      a first source, electrically connected to a corresponding data line; and
      a first drain; and
   a main pixel electrode electrically connected to the first drain; and
   wherein the sub pixel area comprises:
   a sub-switch unit, disposed on the first substrate, comprising:
      a second gate, electrically connected to the corresponding scan line;
      a second source, electrically connected to the corresponding data line; and
      a second drain; and
   a sub-pixel electrode electrically connected to the second drain, wherein the area of the main pixel area is getting larger and the area of the sub-pixel area is getting smaller from the edge to the center of the liquid crystal display panel.

3. The display panel according to claim 2, the pixel area further comprises an electron sharing unit, electrically connected to the sub-pixel electrode for sharing the electrons on the sub-pixel electrode to make the voltage on the sub-pixel electrode is lower than the main pixel electrode.

4. The display panel according to claim 3, the electron sharing unit comprising:
   a sharing switch unit, comprising:
      a third gate, electrically connected a neighboring scan line which is neighboring to the corresponding scan line;
      a third source, electrically connected to the sub-pixel electrode; and
      a third drain; and
   a sharing capacity, electrically connected to the third drain, wherein the sharing switch turns ON for sharing the electron on the sub-pixel electrode to make the voltage on the sub-pixel electrode is lower than the main pixel electrode.

5. The display panel according to claim 4, wherein the main switch unit, the sub-switch unit and the sharing switch unit are thin-film transistors.

6. An array substrate, comprising:
   a plurality of parallel scan lines; and
   a plurality of parallel data lines, disposed across the plurality of scan lines, wherein the array substrate is divided into a plurality of pixel areas by the plurality of scan lines and the plurality of data lines, each pixel area of the plurality of pixel areas having a strip-shape of a longitudinal length equal to each other, each pixel area of the plurality of pixel areas comprising a main pixel area and a sub-pixel area,
   the main pixel area and the sub-pixel having a strip-shape of a corresponding width equal to each other, the main pixel area and the sub-pixel area combined to be the longitudinal length of each pixel area of the multiple pixel areas, a first longitudinal area of the main pixel area gradually increased from a side edge to a center of the array substrate and a second longitudinal area of the sub-pixel area is getting smaller gradually decreased from the side edge to the center of the array substrate.

7. The array substrate according to claim 6, wherein the main pixel area comprises:
   a main switch unit, disposed on the first substrate, comprising:
      a first gate, electrically connected to a corresponding scan line;
      a first source, electrically connected to a corresponding data line; and
      a first drain; and
   a main pixel electrode electrically connected to the first drain; and
wherein the sub pixel area comprises:
   a sub-switch unit, disposed on the first substrate, comprising:
      a second gate, electrically connected to the corresponding scan line;
      a second source, electrically connected to the corresponding data line; and
      a second drain; and
   a sub-pixel electrode electrically connected to the second drain, wherein the area of the main pixel area is getting larger and the area of the sub-pixel area is getting smaller from the edge to the center of the array substrate.

8. The array substrate according to claim 7, the pixel area further comprises an electron sharing unit, comprising:
   a sharing switch unit, comprising:
      a third gate, electrically connected a neighboring scan line which is neighboring to the corresponding scan line;
      a third source, electrically connected to the sub-pixel electrode; and
      a third drain; and
   a sharing capacity, electrically connected to the third drain, wherein the sharing switch turns ON for sharing the electron on the sub-pixel electrode to make the voltage on the sub-pixel electrode is lower than the main pixel electrode.

9. A liquid crystal display panel, comprising:
   a first substrate, comprising:
      a plurality of parallel scan lines disposed on the first substrate; and
      a plurality of parallel data lines disposed on the first substrate, wherein the plurality of scan lines are crossed by the plurality of data lines and the first substrate is divided into multiple pixel areas, each pixel area of the multiple pixel areas having a strip-shape of a longitudinal length equal to each other;
   a second substrate, disposed opposite to the first substrate; and
   a liquid crystal layer sandwiched by the first substrate and the second substrate, wherein each pixel area of the multiple pixel areas comprises a main pixel area and a sub-pixel area,
   the main pixel area and the sub-pixel area having a strip-shape of a corresponding width equal to each other, the main pixel area and the sub-pixel area and the sub-pixel area combined to be the longitudinal length of each pixel area of the multiple pixel areas,
   a first longitudinal area of the main pixel area gradually increased from a side edge to a center of the liquid crystal display panel and a second longitudinal area of the sub-pixel area gradually decreased from the side edge to the center of the liquid crystal display panel, and a voltage applied on the sub-pixel area when displaying is smaller than the main pixel area.

10. The display panel according to claim 9, wherein the area of the main pixel area and the sub-pixel area is distributed symmetrically according to a line between middle points of upper edge and a lower edge of the liquid crystal display panel.

11. The display panel according to claim 9, wherein the area of the main pixel area and the sub-pixel area is constant from the upper edge to the lower edge of the liquid crystal display panel.

12. The display panel according to claim 9, wherein the main pixel area comprises:
   a main switch unit, disposed on the first substrate, comprising:
      a first gate, electrically connected to a corresponding scan line;
      a first source, electrically connected to a corresponding data line; and
      a first drain; and
   a main pixel electrode electrically connected to the first drain; and
wherein the sub pixel area comprises:
   a sub-switch unit, disposed on the first substrate, comprising:
      a second gate, electrically connected to the corresponding scan line;
      a second source, electrically connected to the corresponding data line; and
      a second drain; and
   a sub-pixel electrode electrically connected to the second drain, wherein the area of the main pixel area is getting larger and the area of the sub-pixel area is getting smaller from the edge to the center of the liquid crystal display panel.

13. The display panel according to claim 12, the pixel area further comprises an electron sharing unit, electrically connected to the sub-pixel electrode for sharing the electrons on the sub-pixel electrode to make the voltage on the sub-pixel electrode is lower than the main pixel electrode.

14. The display panel according to claim 13, the electron sharing unit comprising:
   a sharing switch unit, comprising:
      a third gate, electrically connected a neighboring scan line which is neighboring to the corresponding scan line;
      a third source, electrically connected to the sub-pixel electrode; and
      a third drain; and
   a sharing capacity, electrically connected to the third drain, wherein the sharing switch turns ON for sharing the electron on the sub-pixel electrode to make the voltage on the sub-pixel electrode is lower than the main pixel electrode.

15. The display panel according to claim 14, wherein the main switch unit, the sub-switch unit and the sharing switch unit are thin-film transistors.

* * * * *